United States Patent
Tamura et al.

(10) Patent No.: US 9,768,835 B2
(45) Date of Patent: Sep. 19, 2017

(54) METHOD AND ELECTRONIC EQUIPMENT FOR NEAR FIELD COMMUNICATION

(71) Applicant: LENOVO (Singapore) PTE, LTD., New Tech Park (SG)

(72) Inventors: Masahide Tamura, Kawasaki (JP); Hideto Horikoshi, Sagamihara (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 64 days.

(21) Appl. No.: 14/334,404

(22) Filed: Jul. 17, 2014

(65) Prior Publication Data

US 2015/0024684 A1    Jan. 22, 2015

(30) Foreign Application Priority Data

Jul. 19, 2013   (JP) .................................. 2013-150606

(51) Int. Cl.
  *H04B 5/00*   (2006.01)
  *H04B 5/02*   (2006.01)

(52) U.S. Cl.
  CPC ......... *H04B 5/0031* (2013.01); *H04B 5/0056* (2013.01); *H04B 5/02* (2013.01)

(58) Field of Classification Search
  CPC .................................................. H04B 5/0056
  See application file for complete search history.

(56) References Cited

U.S. PATENT DOCUMENTS

| | | | |
|---|---|---|---|
| 9,104,853 B2* | 8/2015 | Mathur et al. | |
| 2009/0143104 A1 | 6/2009 | Loh et al. | |
| 2010/0167643 A1* | 7/2010 | Hirsch | H04L 63/18 455/41.1 |
| 2012/0227092 A1* | 9/2012 | Smith | 726/4 |
| 2013/0210360 A1* | 8/2013 | Ljung et al. | 455/41.2 |
| 2013/0215467 A1* | 8/2013 | Fein et al. | 358/1.15 |

(Continued)

FOREIGN PATENT DOCUMENTS

| | | |
|---|---|---|
| JP | 2002-331686 | 11/2002 |
| JP | 2003-032261 | 1/2003 |

(Continued)

OTHER PUBLICATIONS

"Special topic, Open by NFC! Part 3, Tasks" Nikkei Electronics Magazine, Issue Sep. 17, 2012, (No. 1091), Nikkei BP, Sep. 17,2012, p. 45-49.

(Continued)

*Primary Examiner* — David Bilodeau
(74) *Attorney, Agent, or Firm* — Kunzler Law Group (57) ABSTRACT

A method is provided that establishes a communication link of a common wireless communication function between a first electronic equipment and a second electronic equipment, the first electronic equipment having a common wireless communication function to access a near field communication (NFC) tag using the second electronic equipment, the second electronic equipment having the common wireless communication function and an NFC function. The method further includes acquiring, by the second electronic equipment, data stored in the NFC tag through a close approach operation, and transmitting the data from the second electronic equipment to the first electronic equipment by using the common wireless communication function.

11 Claims, 9 Drawing Sheets

(56) References Cited

U.S. PATENT DOCUMENTS

| | | | | |
|---|---|---|---|---|
| 2013/0303085 A1* | 11/2013 | Boucher et al. | ............. | 455/41.1 |
| 2013/0314334 A1* | 11/2013 | Leica | ................... | H04B 5/0031 |
| | | | | 345/173 |
| 2014/0099887 A1* | 4/2014 | Flanagan | .............. | H04W 4/023 |
| | | | | 455/41.1 |
| 2014/0213181 A1* | 7/2014 | Rosenberg | ........... | H04B 5/0031 |
| | | | | 455/41.1 |

FOREIGN PATENT DOCUMENTS

| | | |
|---|---|---|
| JP | 2010537560 | 12/2010 |
| JP | 2012-160207 | 8/2012 |
| JP | 2012523727 | 10/2012 |
| JP | 2012243315 | 12/2012 |
| JP | 2014529210 | 10/2014 |
| WO | 2013/015571 A2 | 1/2013 |

OTHER PUBLICATIONS

"NFC NXP semiconductors, Capability of FeliCa widens more by peer to peer" CardWave, Issue Nov. 2007 ( vol. 20 No. 11), She-media, Oct. 20, 2007, p. 36-37.

"Actual practice of RFID starting with NFC part 3" Monthly Auto Recognition, Issue Jan. 2013 (vol. 26 No. 1), Japan Industry Publication Co.,Ltd. Jan. 10, 2013, p. 54-57.

"Technology front line of NFC, explained by the No. 1 authority" Nikkei Systems, Issue Mar. 2013 (No. 239), NikkeiBP, Feb. 26, 2013, p. 56-61.

"Don't use Android in initial setting", Nikkei pasokon best muk, Nikkei Business Publication Inc., May 18, 2013, p. 146.

* cited by examiner

FIG. 12

METHOD AND ELECTRONIC EQUIPMENT FOR NEAR FIELD COMMUNICATION

FIELD

The present subject matter relates to a technique which enables electronic equipment to use a near field communication (NFC) function of other electronic equipment as if it were its own NFC function.

BACKGROUND

Radio frequency identification (RFID) is known as a wireless communication technology using a contactless IC card or tag. Near field communication (NFC) is similar in concept to RFID in that it also uses a contactless IC card. However, NFC differs from RFID in that, while some RFID devices enable communication at a distance of several meters, NFC devices have their antennas brought within about two to four centimeters from each other for communication. Their usages are also different. Therefore, separately from RFID, a standards body called "NFC Forum" has developed technical specifications for NFC and defined them as ISO/IEC 14443 and ISO/IEC 18092.

Recently, smartphones and tablet terminals equipped with an NFC module have appeared. For NFC, passive communication and active communication are defined. In passive communication, a reader/writer communicates with a contactless IC card or tag having no power source. In active communication, two devices both having power sources communicate with each other by alternately acting as an initiator and a target. The NFC standards specify the following three functions: a card emulation function of substituting for a contactless IC card; a reader/writer function for reading an NFC tag; and a peer-to-peer (P2P) function for two NFC devices to communicate with each other.

With the reader/writer function, an NFC device is able to read four types of contactless IC cards of "Type 1" through "Type 4" including Felica® and Mifare®. In NFC, an NFC antenna of one device needs to be brought within the communicable distance of an NFC antenna of the other device. With NFC, however, it is possible to access a contactless IC card having no power source to read or write data and it is only necessary to bring the devices in close proximity to start or finish communication. Therefore, in the smartphones and tablet terminals which can be held with one hand, NFC has been used in various fields including smart posters and electronic settlement.

SUMMARY

At present, many laptop PCs are not equipped with the NFC function. With design requirements as well as demands for thinner and lighter devices, a laptop PC may be formed entirely with an aluminum, magnesium, or other metal chassis. In this case, it is difficult to provide an NFC antenna. For communicating using the NFC function, two NFC antennas have to be physically brought within a communicable distance from each other. Accordingly, in order for a laptop PC equipped with the NFC function to communicate with an NFC tag attached to an immobile place, such as a fixed or heavy object, by using the NFC function, the laptop PC needs to be brought close to the NFC tag.

Bringing a laptop PC, with its display chassis in an open state, to an NFC tag is difficult compared to the case of a smartphone, and it may be even impossible depending on the place where the NFC tag is attached. In the case where an NFC antenna is provided at the rear side of the plastic decorative panel surrounding the keyboard, it is not easy to bring the NFC antenna close to an NFC tag attached to a poster. The same problem arises even if an NFC dongle connected to a USB port is used.

On the other hand, with a laptop PC equipped with a display larger than that of a smartphone and allowing the use of a hardware keyboard, the operation of downloading data from a Web site is easy compared to the case with a smartphone or tablet terminal. However, the laptop PC is inconvenient for the operation of causing a reader/writer at an entrance of a theater to read the information of the theater ticket that was bought from a Web site. NFC is high in safety because there is almost no risk of interception of radio waves. It will be convenient if a laptop PC which is not equipped with an NFC function can use the NFC function to read credit card information for settlement.

In view of the foregoing, in one embodiment of the subject matter disclosed herein, an NFC function may be used in electronic equipment having no NFC function. In some embodiments of the subject matter disclosed herein, the NFC function may be used conveniently in electronic equipment with which a close approach operation is difficult. In certain embodiments of the subject matter disclosed herein, electronic equipment and computer programs may be used to implement various features of the disclosed subject matter.

A first aspect of the present subject matter discloses a method for a first electronic equipment equipped with a common wireless communication function to access an NFC tag by using a second electronic equipment equipped with the common wireless communication function and an NFC function. In one embodiment, the first electronic equipment and the second electronic equipment establish a connection using the common wireless communication functions. In some embodiments, the second electronic equipment reads data stored in the NFC tag through a close approach operation. In certain embodiments, the second electronic equipment transmits the read data to the first electronic equipment using the common wireless communication function.

With the above configuration, in one embodiment, the second electronic equipment allows the first electronic equipment to emulate an NFC-equipped device, so that the first electronic equipment can access the NFC tag via the NFC-equipped device. In some embodiments, it is more convenient to use the NFC function of the second electronic equipment even if the first electronic equipment is equipped with the NFC function. Therefore, in certain embodiments, the first electronic equipment may be equipped with the NFC function. The first electronic equipment may comprise a laptop PC.

The close approach operation, as used herein, refers to the operation of moving one or both of the second electronic equipment and the NFC tag such that they fall within a distance at which the NFC antennas can transmit and/or receive radio waves. The first electronic equipment and the second electronic equipment may use their common wireless communication functions to communicate with each other. Therefore, in the case where the second electronic equipment comprises portable electronic equipment that can be held with one hand and brought within close proximity to the NFC tag, the NFC tag may be attached to a fixed object. In such an embodiment, even if the first electronic equipment is equipped with the NFC function, when the first electronic equipment is relatively large in size, it may be more convenient to access the NFC tag through the second electronic equipment, rather than using the NFC function of the first electronic equipment.

The second electronic equipment, which can be held with one hand and brought close to the NFC tag, may comprise a smartphone or a tablet terminal. In one embodiment, the first electronic equipment is operable, in response to data or a message received from the second electronic equipment through the common wireless communication function, to execute an application program for processing the data stored in the NFC tag, and cause the application program to process the data. For example, in the case where the data stored in the NFC tag is a URL of a smart poster, it may only be necessary to bring the second electronic equipment close to the NFC tag to cause the first electronic equipment to display the site related to the smart poster in a Web browser associated with the first electronic equipment. Further, in some embodiments, data that the second electronic equipment has received from the first electronic equipment through the common wireless communication function can be written into the NFC tag through the close approach operation.

A second aspect of the present subject matter discloses a method for a computer equipped with a common wireless communication function to perform login authentication by receiving authentication information stored in an NFC tag through electronic equipment equipped with the common wireless communication function and an NFC function. In such an embodiment, the computer enters a standby state in which it waits for a password to login to an operating system. In one embodiment, the computer and the electronic equipment establish a connection of the common wireless communication functions. In some embodiments, the electronic equipment reads the authentication information from the NFC tag through a close approach operation. In certain embodiments, the authentication information is transmitted from the electronic equipment to the computer through the common wireless communication functions.

With the above configuration, in some embodiments, login authentication may be performed through the close approach operation between the electronic equipment and the NFC tag, without the need of inputting a password from the keyboard. If the NFC tag is mounted on a contactless IC card for personal identification, such as an employee ID card, for example, it may be possible to perform the admission management and the computer access management in an integrated fashion. Even in the absence of a biometric authentication device, it may be possible to perform the login authentication without an input of a password. In certain embodiments, this reduces the complexity resulting from settings associated with login passwords.

A third aspect of the present subject matter discloses a method for a first electronic equipment equipped with a common wireless communication function and a third electronic equipment equipped with the common wireless communication function and an NFC function to pair the common wireless communication functions through a second electronic equipment equipped with the common wireless communication function and the NFC function. In such an embodiment, the first electronic equipment and the second electronic equipment establish a connection of the common wireless communication functions. In one embodiment, through a close approach operation, the second electronic equipment uses the NFC function to acquire pairing information from the third electronic equipment. In some embodiments, the second electronic equipment uses the common wireless communication function to transmit the pairing information to the first electronic equipment. The first electronic equipment and the third electronic equipment may perform the pairing on the basis of the pairing information.

With the above configuration, in one embodiment, the user may only need to bring the second electronic equipment and the third electronic equipment close to each other, so that the first electronic equipment and the third electronic equipment both enter the pairing mode and automatically pair their common wireless communication functions. Even in the case where the first electronic equipment detects a plurality of pieces of electronic equipment equipped with the common wireless communication function, in some embodiments, the partner for pairing has been specified by the close approach operation. This may eliminate the need for the user to select the connection partner. In a further embodiment, even in the case where the third electronic equipment designates a common passcode that the first electronic equipment and the third electronic equipment should hold for pairing, it may be unnecessary for the user to input from the keyboard the designated passcode to the first electronic equipment.

A fourth aspect of the present subject matter discloses a method for a first electronic equipment equipped with a common wireless communication function and a third electronic equipment equipped with the common wireless communication function and an NFC function to connect the common wireless communication functions through second electronic equipment equipped with the common wireless communication function and the NFC function. In one embodiment, after the common wireless communication functions of the first electronic equipment and the third electronic equipment have been paired, a communication link is disconnected. Consequently, the first electronic equipment may cause the common wireless communication function to enter a connection mode.

The first electronic equipment and the second electronic equipment, in certain embodiments, establish a connection of the common wireless communication functions. Through a close approach function, the second electronic equipment may use the NFC function to transmit a command to enter a connection mode to the third electronic equipment. On receipt of the command, in some embodiments, the third electronic equipment causes the common wireless communication function to enter the connection mode. The first electronic equipment and the third electronic equipment, which may have both entered the connection mode, establish a connection of the common wireless communication functions. In such an embodiment, a communication link of the common wireless communication functions between the first electronic equipment and the third electronic equipment may be established, through the close approach operation of the second electronic equipment with the third electronic equipment, without the need of the operation of causing the third electronic equipment to enter the connection mode.

In some embodiments, as disclosed herein, it is possible to allow an NFC function to be used in electronic equipment having no NFC function. In a further embodiment, according to the present subject matter, it is possible to allow the NFC function to be used conveniently in electronic equipment with which a close approach operation is difficult. In a further embodiment, according to the present subject matter, it is possible to provide the electronic equipment and the computer programs implementing the various features of the subject matter disclosed herein.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of its scope, the embodiments will be described and explained with additional specificity and detail through the use of the accompanying drawings, in which.

DETAILED DESCRIPTION

Figure 1:
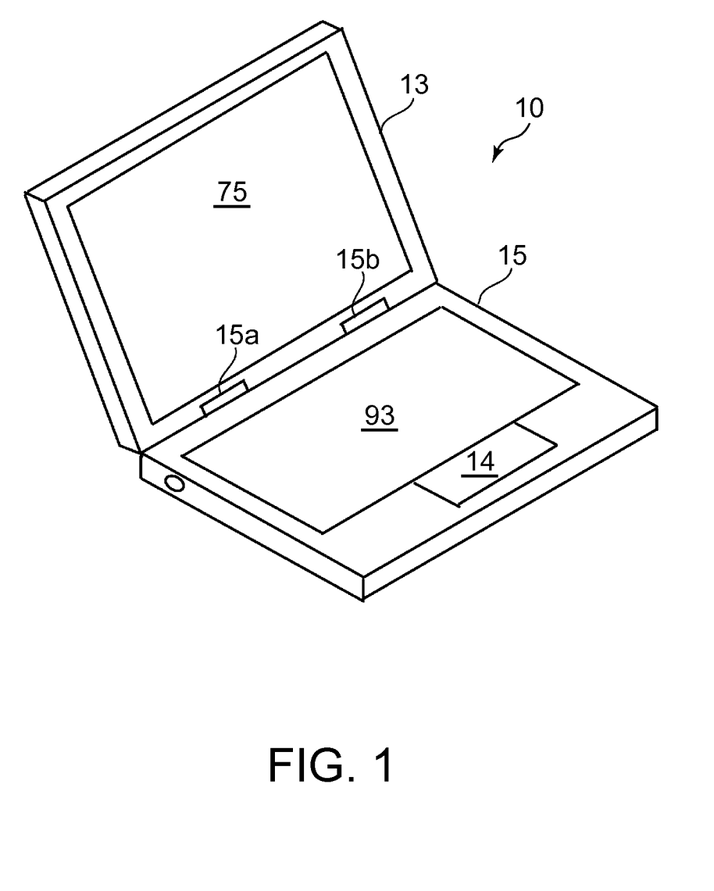
FIG. 1 shows the appearance of a laptop PC according to an embodiment of the present subject matter.
Figure 2:
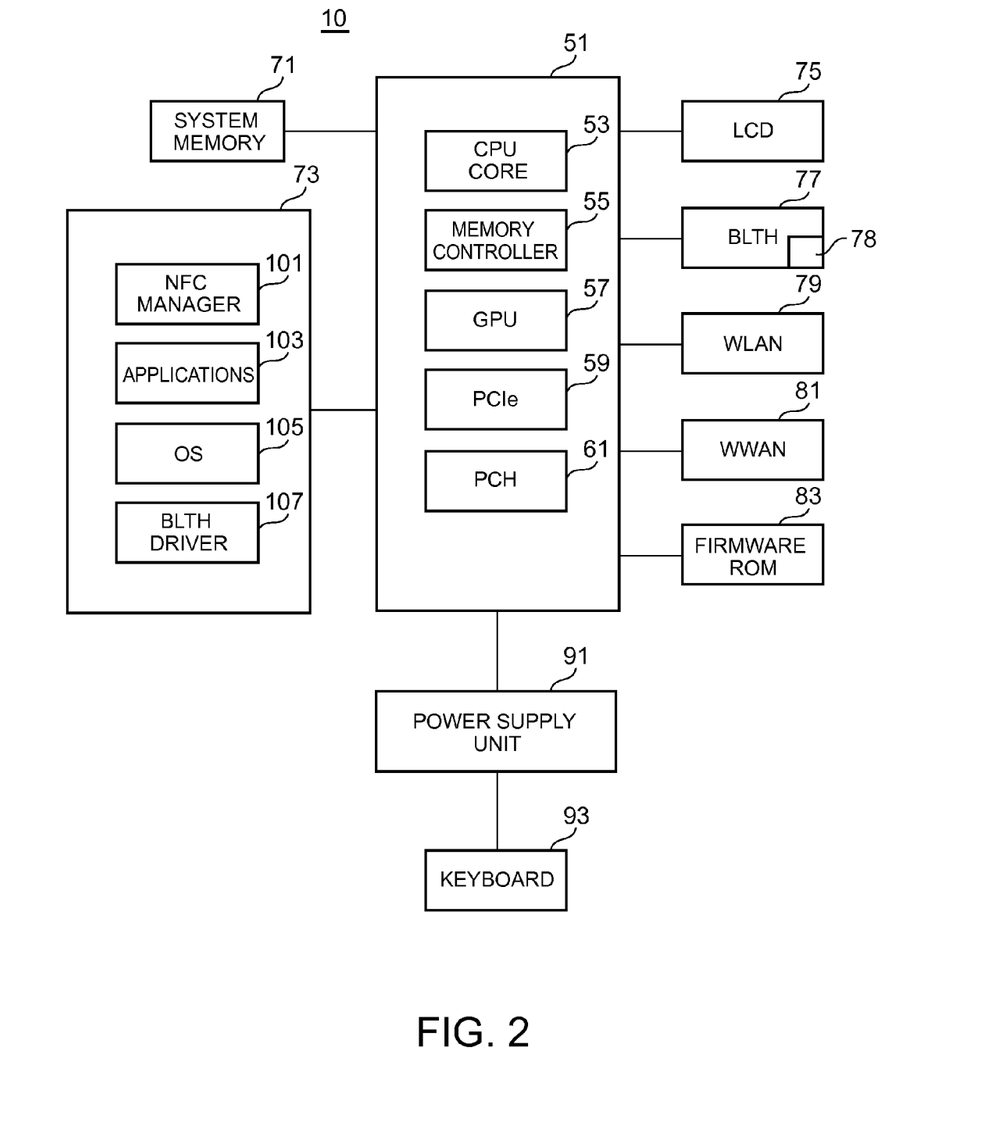
FIG. 2 is a functional block diagram showing a configuration of the laptop PC.

FIG. 1 shows the appearance of a laptop PC 10 according to an embodiment of the present subject matter, and FIG. 2 is a functional block diagram illustrating the major configuration of the laptop PC 10. As shown in FIG. 1, the laptop PC 10 has a display chassis 13 and a system chassis 15 joined by hinges 15a and 15b in an openable and closable manner. The display chassis 13 has an LCD 75 mounted thereon. The system chassis 15 has a keyboard 93 and a touch pad 14 mounted on its surface, and houses a system device therein. In the present embodiment, it is assumed that the laptop PC 10 is not equipped with an NFC function.

In certain embodiments, the laptop PC 10 may not need to rely on the hardware configuration. FIG. 2 shows one embodiment of a hardware configuration for the present subject matter. A CPU package 51 includes a CPU core 53, a memory controller 55, a GPU 57, a PCIe interface 59, and a platform controller hub (PCH) 61, which are configured as a single package in the form of multi-chip module (MCM).

The CPU package 51 is typically connected with: a system memory 71 which temporarily stores a program executed by the CPU core 53, a hard disk drive (HDD) 73 which stores a program executed by the CPU core 53, an LCD 75, a Bluetooth® (BLTH) module 77, a wireless LAN module 79, a wireless WAN module 81, a firmware ROM 83 which stores system firmware such as UEFI or BIOS, and a power supply unit 91. The BLTH module 77 includes a volatile memory 78, which temporarily stores authentication information for login.

The power supply unit 91 includes a battery, a charger, a keyboard/mouse controller, and an embedded controller for controlling electric power. The power supply unit 91 is typically connected with the keyboard 93. The HDD 73 stores software such as an NFC manager 101, applications 103, including a Web browser and a connection tool for managing BLTH pairing and BLTH connection, an OS 105, and a BLTH driver 107.

Figure 3:
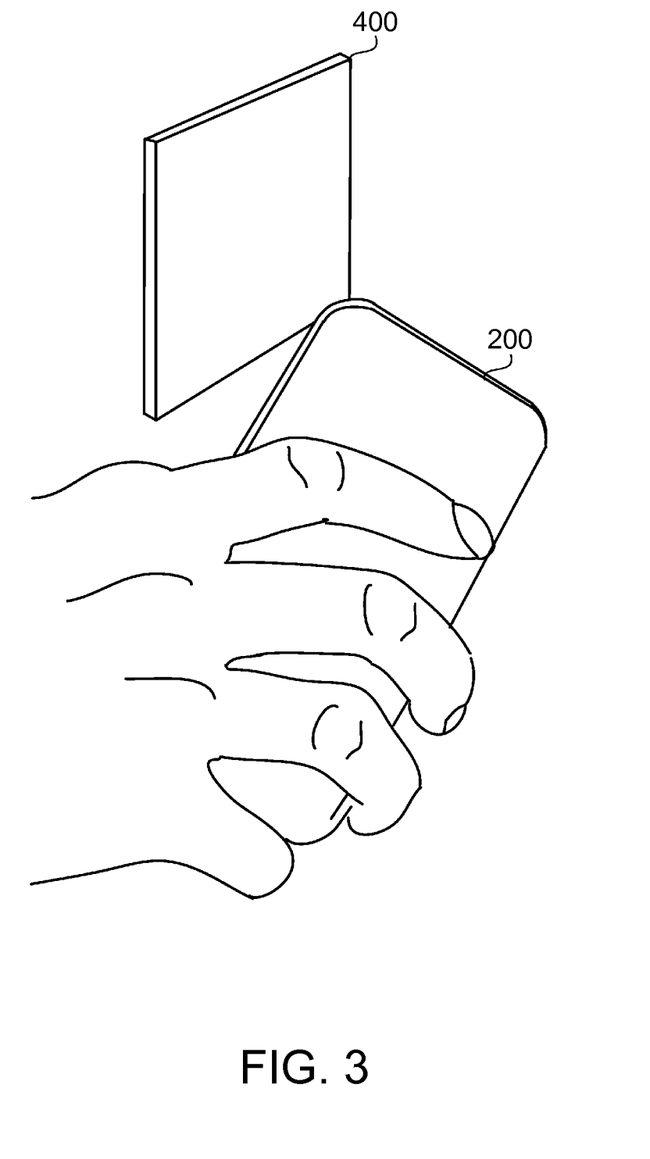
FIG. 3 illustrates how a handheld smartphone is brought close to an NFC tag.
Figure 4:
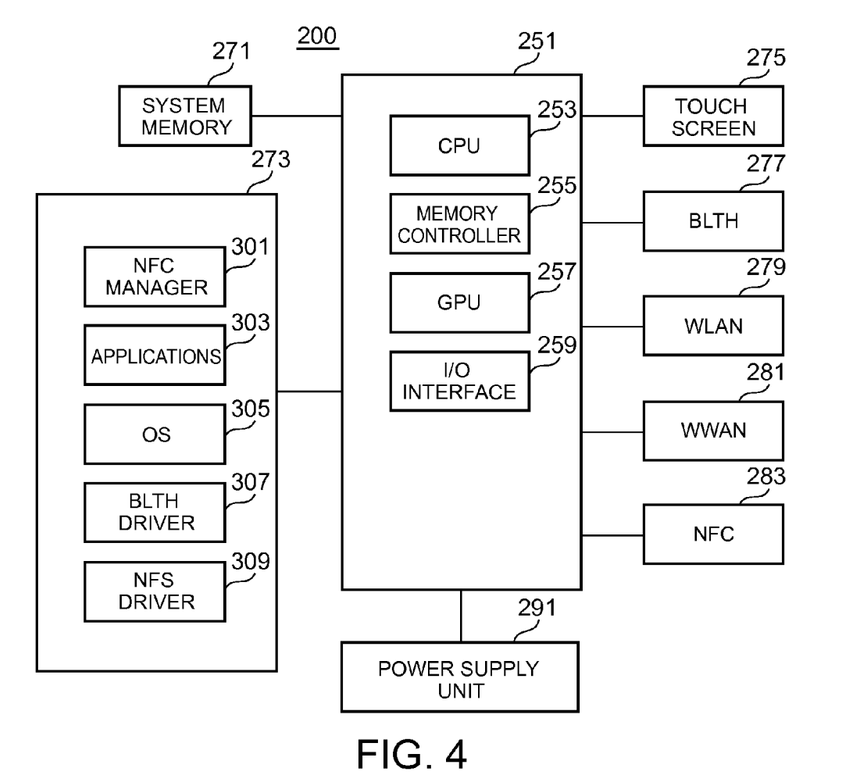
FIG. 4 is a functional block diagram showing a configuration of a smartphone according to an embodiment of the present subject matter.

The NFC manager 101 controls the operations for the laptop PC 10 to use the NFC function of a smartphone 200 (FIGS. 3 and 4). The NFC manager 101 receives, from the applications 103, commands and data to be written into an NFC tag 400 (FIG. 5) or 500 (FIG. 6), and transmits them to the smartphone 200 via the BLTH module 77.

The NFC manager 101 receives data that the smartphone 200 has read from an NFC tag 400 or 500 from the smartphone 200 via the BLTH module 77, and causes a prescribed application 103 to process the data. The BLTH driver 107 is a device driver which controls the operations of the BLTH module 77 and also controls data transfer to and from the CPU package 51. The BLTH driver 107 performs processing for login authentication through the smartphone 200, as will be described later with reference to FIG. 12.

FIG. 3 shows how a smartphone 200 according to an embodiment of the present subject matter is held with one hand and brought close to an NFC tag 400 which is attached to an immobile object. FIG. 4 is a functional block diagram illustrating the major configuration of the smartphone 200. As shown in FIG. 3, the smartphone 200 can be held with one hand and readily brought close to an NFC tag 400 to fall within a distance at which they can communicate by using the NFC functions. Examples of the portable electronic equipment which can be held with one hand and brought close to an NFC tag include, besides the smartphone 200, a tablet terminal, a personal digital assistant (PDA), a smart watch, an optical head-mounted display, or the like.

Like the laptop PC 10, the smartphone 200, in certain embodiments, does not rely on a specific hardware configuration. FIG. 4 shows one embodiment of a hardware configuration associated with the present subject matter. A CPU package 251 includes a CPU core 253, a memory controller 255, a GPU 257, and an I/O interface 259, which are configured as a single MCM package.

The CPU package 251 is typically connected with: a system memory 271, which temporarily stores a program executed by the CPU core 253, a solid state drive (SSD) 273, which stores a program executed by the CPU core 253, a touch screen 275, a BLTH module 277, a wireless LAN module 279, a wireless WAN module 281, an NFC module 283, and a power supply unit 291. The BLTH module 277 is an example of a common wireless communication function which communicates with the BLTH module 77 of the laptop PC 10.

The NFC module 283 includes an NFC chip, an NFC memory, and an NFC antenna. In some embodiments, the NFC module 283 belongs to the "Proximity" type defined in ISO/IEC 14443, operating at the 13.56 MHz frequency with a maximum communication distance of 100 millimeters, and it communicates by electromagnetic induction. In the present subject matter, any communication system operating at other frequencies by another communication principle is treated as NFC, as long as it communicates through a close approach operation with a maximum communication distance of about 100 millimeters.

The NFC module 283 works in cooperation with the CPU package 251 and a program stored in the SSD 273, to operate in one of the following operating modes: a card emulation mode of implementing a contactless IC card function; a reader/writer mode of implementing a function of accessing a contactless IC card or tag; and a peer-to-peer (P2P) mode of implementing a bidirectional communication with another device equipped with the NFC function.

The SSD 273 stores software such as an NFC manager 301, general applications 303, including a Web browser and a music reproduction program, an OS 305, a BLTH driver 307, and an NFC driver 309. The NFC manager 301 controls the operations of the smartphone 200 when the smartphone 200 provides the laptop PC 10 with the NFC function.

The NFC manager 301 transfers data that was read from an NFC tag 400 or 500 via the NFC module 283, to the laptop PC 10 via the BLTH module 277, so that the data is processed by a prescribed application in the laptop PC 10. The NFC manager 301 writes data which was received from the laptop PC 10 via the BLTH module 277, into an NFC tag 400 or 500 via the NFC module 283.

The BLTH driver 307 is a device driver that controls the operations of the BLTH module 277 and also controls data transfer to and from the CPU package 251. The NFC driver 309 is a device driver which controls the operations of the NFC module 283 and also controls data transfer between the NFC module 283 and a program executed by the CPU core 253. The NFC driver 309 controls the NFC module 283 to operate in one of the three operating modes.

[NFC Tag]

Figure 5:
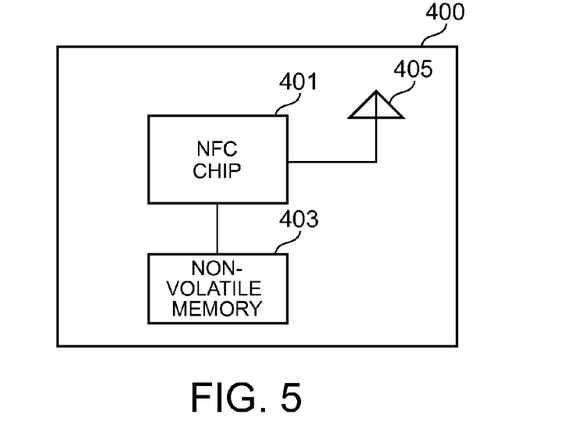
FIG. 5 illustrates the configuration of an NFC tag.

FIG. 5 is a functional block diagram illustrating the configuration of an NFC tag. The NFC tag 400 primarily includes an NFC chip 401, a non-volatile memory 403, and an antenna 405. The NFC tag 400 is passive, meaning that it does not have any power source. The NFC tag 400 operates with electric power which is induced in the antenna 405 through electromagnetic induction by radio waves emitted from an externally approaching reader/writer. In the non-volatile memory 403, information indicating the attribute of the object to which the NFC tag is attached is written in advance by an NFC reader/writer.

The smartphone 200 is capable of getting close to the NFC antenna 405 for reading data from or writing data to the NFC memory 403 via the NFC module 283. The NFC chip 401 includes a processor and firmware, and controls an access to the NFC memory 403 by the smartphone 200 or another reader/writer. The NFC chip 401 operates when the voltage induced in the NFC antenna 405 with the approach of the smartphone 200 has increased to a prescribed value or more. The NFC chip 401 controls a resonant circuit of the NFC antenna 405 to control the load on the NFC module 283, to thereby communicate with the smartphone 200.

In application of the present subject matter, the object to which the NFC tag 400 is attached and the data stored in the NFC memory 403 do not have to be restricted particularly. For example, in the case where an NFC tag 400 is attached to a smart poster 450 and a URL of the Web site related to the smart poster 450 is stored in the NFC memory 403, then the smartphone 200 can be brought close to the tag to display the Web site corresponding to the URL.

Further, for example, in the case where an NFC tag 400 is attached to a bus timetable posted at a station and data of the timetable is stored in the NFC memory 403, then the smartphone 200 can be brought close to the tag to display the text data of the timetable. An object for attaching an NFC tag 400 may be electronic equipment that does not directly access the NFC tag 400. In this case, for example, inventory data or maintenance data of the electronic equipment may be stored in the NFC memory 403.

[NFC Device]

Figure 6:
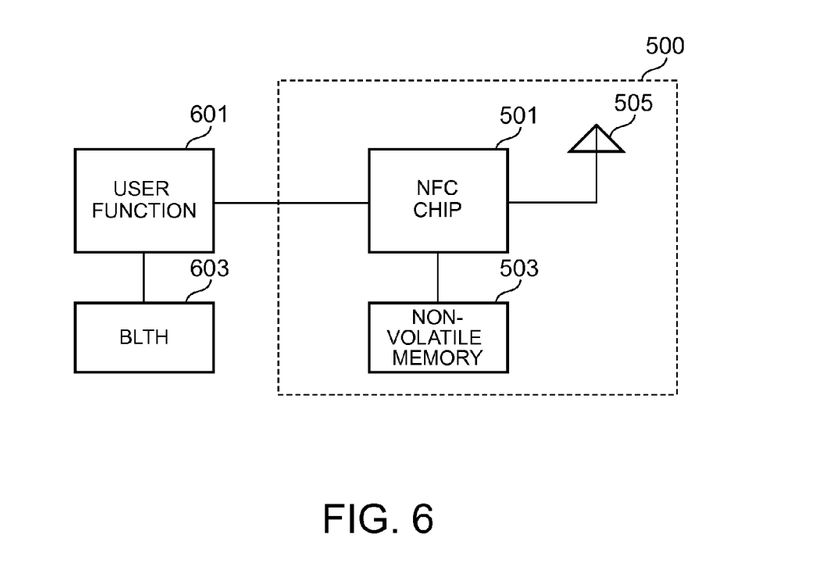
FIG. 6 illustrates the configuration of an NFC device.

FIG. 6 is a functional block diagram illustrating a general configuration of an NFC device 600 provided with an NFC tag 500. The NFC device 600 is made up of the NFC tag 500 and a user function 601 which communicate with each other. While the smartphone 200 and a tablet terminal are NFC devices, here, a description will be made of a general configuration of an NFC device with which the smartphone 200 communicates by using the NFC function. The NFC tag 500 primarily includes an NFC chip 501, a non-volatile memory 503, and an antenna 505.

Unlike the NFC tag 400, the NFC tag 500 has its NFC chip 501 connected to the user function 601. The user function 601 may include electronic equipment that implements a service function for a user. The user function 601 includes a functional device that implements a prescribed service, a CPU, a system memory, and a communication function with the NFC chip 501. The NFC tag 500 works in cooperation with the user function 601 to implement the card emulation function, the reader/writer function, and the peer-to-peer function.

The NFC device 600 includes a BLTH module 603 as an example of the common wireless communication function. It should be noted that, while an NFC device 600 to which the present subject matter is applied indispensably has the NFC function, it may not have the common wireless communication function. Further, the common wireless communication function included in the NFC device 600 may be different from the common wireless communication function formed between the laptop PC 10 and the smartphone 200. Other examples of the common wireless communication function include a wireless LAN system supporting Wi-Fi Direct® or in an ad hoc mode capable of being directly connected to the wireless LAN module 79 of the laptop PC 10.

In the user function 601, the functional device implementing a service can be a hands-free headphone or a printer that communicates with the laptop PC 10 via the BLTH module 603. Alternatively, the functional device in the user function 601 may be a device which does not directly communicate with the laptop PC 10 but reads settlement information or ticket information from the smartphone 200 for processing. The NFC chip 501 operates with electric power which is received through electromagnetic induction when the smartphone 200 approaches the tag. The NFC chip 501 can issue a wake-up event to wake up the user function 601 in a sleep state.

Figure 7:
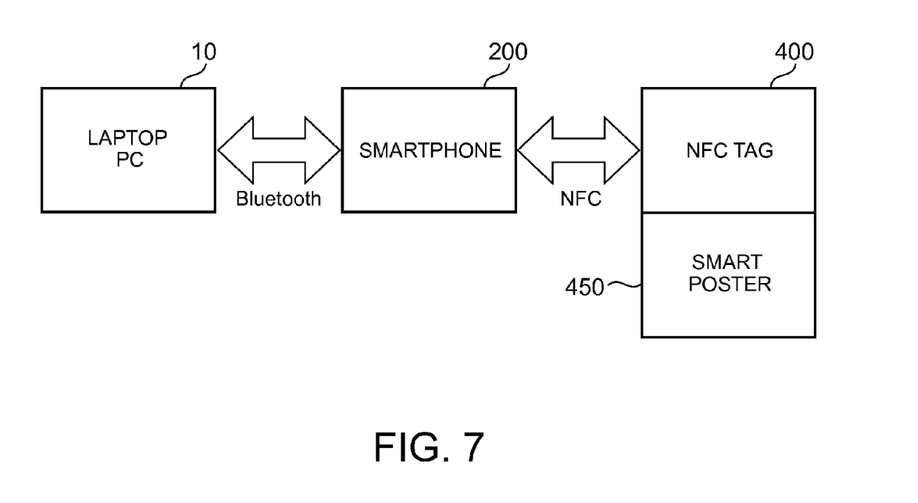
FIG. 7 illustrates a method for the laptop PC to access an NFC tag by using the NFC function of the smartphone.
Figure 8:
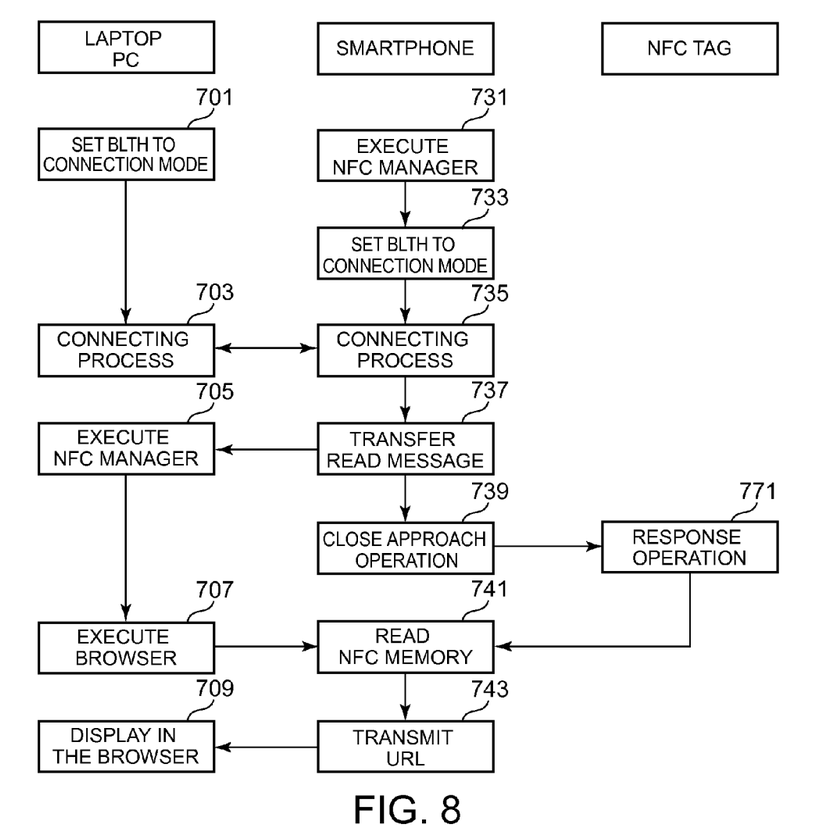
FIG. 8 is a flowchart illustrating the procedure in FIG. 7.

FIG. 7 shows how the laptop PC 10 uses the NFC function of the smartphone 200 to read a URL from an NFC tag 400 attached to a smart poster 450 for displaying a Web site of the URL in a Web browser, and FIG. 8 is a flowchart illustrating the procedure. In FIG. 8, blocks 701 to 709 show operations of the laptop PC 10, blocks 731 to 743 show operations of the smartphone 200, and a block 771 shows an operation of the NFC tag 400.

Here, it is assumed that the BLTH module 77 of the laptop PC 10 and the BLTH module 277 of the smartphone 200 have been registered (paired) in advance. In block 701 in FIG. 8, a user supplies power to the BLTH module 77 of the laptop PC 10 to make it enter a connection mode. The BLTH driver 107 which has entered the connection mode searches for another BLTH device in a connection mode, and in the case where they have already been paired, they can automatically establish a connection.

In block 731, the user taps on the touch screen 275 of the smartphone 200 to execute the NFC manager 301. In the case where the smartphone 200 provides the laptop PC 10 with a plurality of NFC functions, as described in conjunction with FIGS. 8, 10, and 11, the NFC manager 301 may display on the touch screen 275 an icon indicating the operation for reading data from the NFC tag 400. Either the block 701 or the block 731 may be performed first.

In block 733, the NFC manager 301 supplies power to the BLTH module 277 of the smartphone 200 to make the module enter a connection mode. In blocks 703 and 735, the BLTH driver 107 of the laptop PC 10 and the BLTH driver 307 of the smartphone 200 automatically establish a BLTH communication link. In block 737, the NFC manager 301 transmits, to the laptop PC 10 via the BLTH module 277, a message for causing the laptop PC 10 to prepare for reading a URL stored in the NFC tag 400. This message indicates that a Web browser should be executed because the data to be sent next is a URL, and that the destination of the message is the NFC manager 101.

In block 705, on receipt of the message, the OS 105 of the laptop PC 10 executes the NFC manager 101, and transmits the received message to the NFC manager 101. When the NFC manager 101 receives the message, if the Web browser is currently executed, the NFC manager 101 transmits to the smartphone 200 a message indicating that it has become ready to receive the URL. If the Web browser has not been executed, in block 707, the NFC manager 101 executes the Web browser, and then transmits a similar message. It should be noted that, in FIG. 8, the transfer of the message is shown as a flow from the block 707 to the block 741.

In block 739, the user brings the smartphone 200 close to the NFC tag 400. Even in the case where the NFC tag 400 is attached to a poster 450, the user can readily hold the smartphone 200 with one hand and bring it close to the tag. In block 771, the NFC chip 401 operates as it is supplied with electric power by electromagnetic induction as a result of the approach of the smartphone 200. The NFC manager 301, which has received a response from the NFC chip 401, transmits to the NFC tag 400 a command to read the URL stored in the NFC memory 403. In block 741, after receiving the message from the laptop PC 10 indicating that it has become ready to receive the URL, the NFC manager 301 reads the URL from the NFC memory 403, and in block 743, the NFC manager 301 transmits the read URL to the laptop PC 10 via the BLTH module 277.

In block 709, the NFC manager 101 transmits the received URL to the Web browser. The laptop PC 10 accesses the network, via the wireless LAN module 79 or the wireless WAN module 81, to display the Web site of the URL on the LCD 75. In the case where an application other than the Web browser receives data other than the URL of the NFC tag 400 in the laptop PC 10, in block 731, the NFC manager 301 may cause a user to select the application that processes the data. In block 737, the NFC manager 301 may generate a message for causing the laptop PC 10 to start the application corresponding to the device as a target of the close approach operation this time and to be ready for receiving data, and transmit the generated message to the NFC manager 101.

According to the above procedure, operations that the user performs for the purposes of displaying a Web site of the URL stored in the NFC tag 400 on the LCD 75 of the laptop PC 10 are only the following: in block 701, supplying electric power to the BLTH module 77 of the laptop PC 10 to cause it to enter the connection mode; in block 731, executing the NFC manager 301; and in block 739, bringing the smartphone 200 close to the NFC tag 400.

If the NFC function of the smartphone 200 is not used, a user may start the Web browser in the laptop PC 10, input the URL from the keyboard, or perform a search using a search engine. Further, in order to display a Web site of the smart poster 450 on a laptop PC equipped with an NFC module, the laptop PC will have to be brought close to the NFC tag 400, which is not as easy as in the case of a smartphone 200. In contrast, bringing the smartphone 200 close to an object as in the present embodiment can considerably lessen the user's burden compared to the case of using the laptop PC 10.

The procedure illustrated in FIG. 8 was an example of reading the data in the NFC tag 400 by the laptop PC 10. Alternatively, the NFC function of the smartphone 200 may be used to write data of the laptop PC 10 into the NFC tag 400. In this example, in block 731, the NFC manager 301 is selected for writing by the user, and in block 737, the NFC manager 301 transmits a message for writing data into the NFC tag 400, to the NFC manager 101. In response thereto, the NFC manager 101 transmits data to the NFC manager 301 via BLTH. The NFC manager 301 which has received the data can use the NFC function through the close approach operation in blocks 739, 771, and 741, to write the data into the NFC tag 400.

Figure 9:
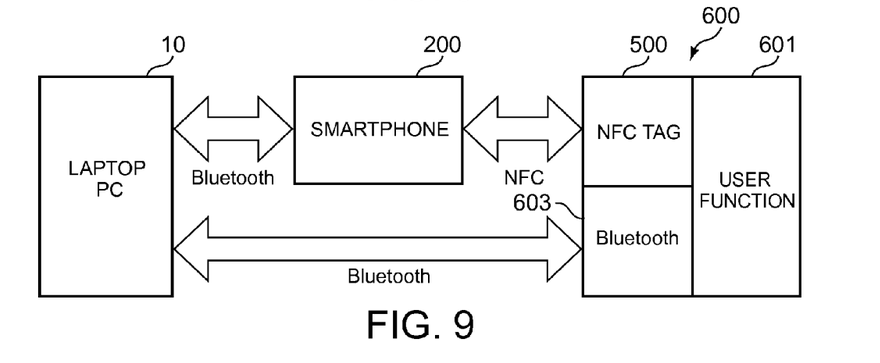
FIG. 9 illustrates a method for performing BLTH pairing between the laptop PC and an NFC device by using the NFC function of the smartphone.
Figure 10:
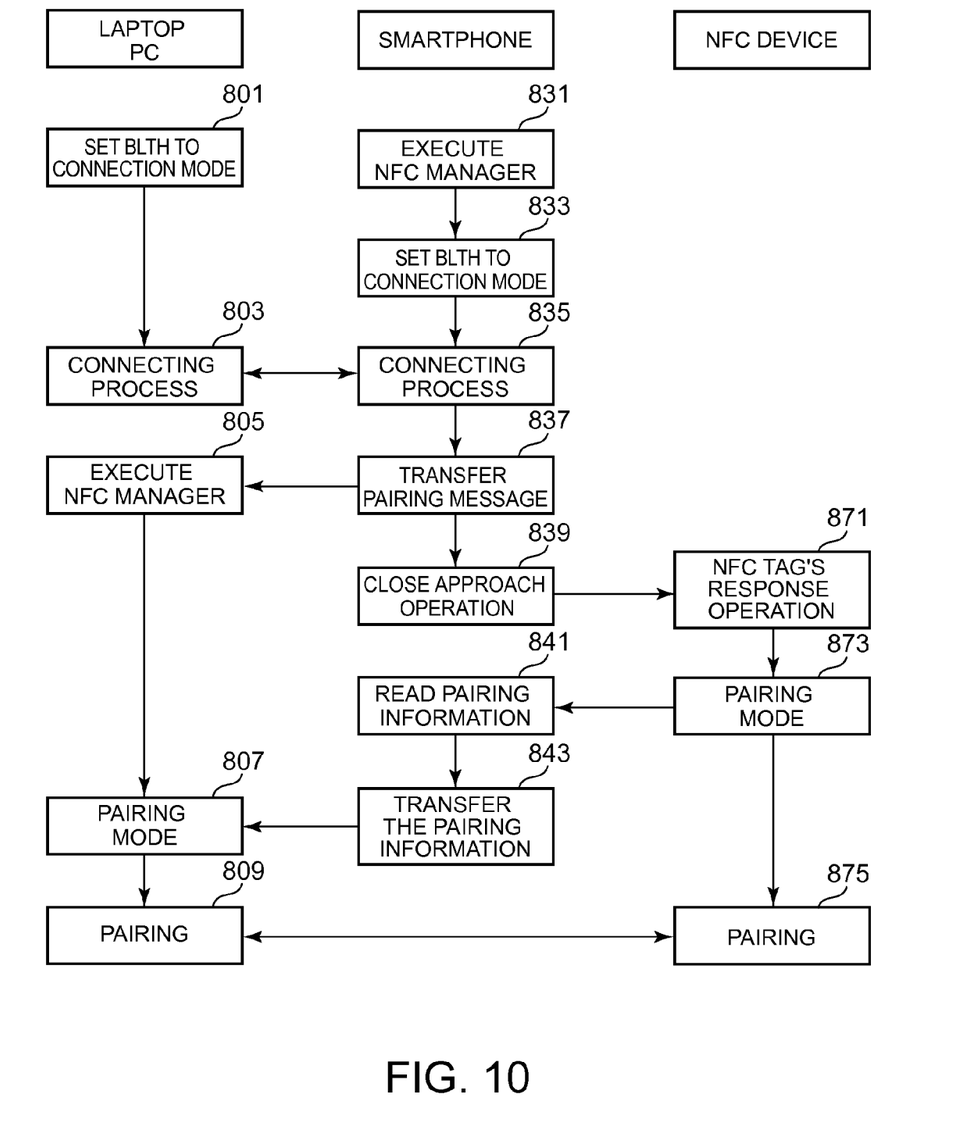
FIG. 10 is a flowchart illustrating the procedure in FIG. 9.

The procedure for performing BLTH pairing between the laptop PC 10 and the NFC device 600 by using the smartphone 200 will now be described. FIG. 9 illustrates how the smartphone 200 is used for BLTH pairing between the laptop PC 10 and the NFC device 600, and FIG. 10 is a flowchart illustrating the procedure. In FIG. 10, blocks 801 to 809 show operations of the laptop PC 10, blocks 831 to 843 show operations of the smartphone 200, and blocks 871 to 875 show operations of the NFC device 600.

Blocks 801, 803, 833, and 835 are identical to the blocks 701, 703, 733, and 735 in FIG. 8, and thus, the description thereof will not be repeated. It is assumed that the BLTH modules 77 and 277 have been paired in advance, as in the procedure in FIG. 8. It is also assumed that pairing information such as a passcode, BLTH address, device name and the like has been stored in the non-volatile memory 503 of the NFC device 600 through the user function 601 or another NFC reader/writer. The user function 601 may be awake or asleep. In block 831, the user executes the NFC manager 301 and selects the procedure for BLTH pairing between the laptop PC 10 and the NFC device 600.

In block 837, the NFC manager 301 transmits a message for pairing with an NFC device, to the laptop PC 10 via BLTH. The message does not have to include the information for specifying the NFC device 600 as a partner. In block 805, the OS 105 executes the NFC manager 101 and transmits the received message to the NFC manager 101.

In block 807, the NFC manager 101 instructs the BLTH driver 107 to cause the BLTH module 77 to enter a pairing mode. The BLTH module 77, which has entered the pairing mode, broadcasts an inquiry (IQ) packet to detect any slave present in the vicinity. At this stage, however, the BLTH driver 107 does not know the passcode or the BLTH address of the NFC device 600 with which the link will be established this time. Therefore, pairing with the NFC device 600 is not possible yet.

In block 839, the user brings the smartphone 200 close to the NFC tag 500 through the close approach operation. In block 871, the NFC chip 501 operates as a result of the approach of the smartphone 200. The NFC manager 301, which has received a response from the NFC tag 500, transmits a command to read the data stored in the NFC memory 503 for pairing, to the NFC tag 500 via the NFC module 283.

In block 873, the NFC chip 501 reads the command written in the non-volatile memory 503, and wakes up the user function 601 if necessary and transmits the command to the user function 601. The user function 601 executes the command and supplies electric power to the BLTH module 603. The BLTH module 603 supplied with power enters a pairing mode so that the master can search for, and, on receipt of the IQ packet transmitted from the laptop PC 10, the BLTH module 603 responds with a frequency hop synchronization (FHS) packet. In certain embodiments, at this point, the BLTH driver 107 of the laptop PC 10 cannot complete the pairing because it does not know the passcode or the BLTH address of the NFC device 600.

In block 841, the NFC chip 501 reads the pairing information such as the passcode and the BLTH address, stored in the NFC memory 503, and transmits the information to the NFC manager 301 of the smartphone 200. From a standpoint of the NFC manager 301, this operation corresponds to reading the data in the NFC memory 503. In block 843, the NFC manager 301 transmits the read pairing information to the NFC manager 101 of the laptop PC 10 via BLTH. The NFC manager 101 passes the received pairing information to the BLTH driver 107.

In blocks 809 and 875, the laptop PC 10 and the NFC device 600 having their BLTH modules both in the pairing mode and having the common passcode are paired. The BLTH driver 107 uses the pairing information received from the smartphone 200 to specify the NFC device 600 having the BLTH address acquired by the smartphone 200 through the close approach operation this time, and completes the pairing. Even in the case where a plurality of BLTH devices are detected, the BLTH driver 107 can recognize that the NFC device 600 whose BLTH address has been received through the close approach operation is the connection partner. This configuration can eliminate the operation of selecting the BLTH device, which the user had to perform when directly pairing the laptop PC 10 with the NFC device 600.

Further, the laptop PC 10 can receive the passcode from the NFC device 600 via the smartphone 200. This can eliminate the operation of inputting the passcode, which the user had to perform when directly pairing them. Once the pairing is complete, from the next time on, the BLTH module 77 of the laptop PC 10 and the BLTH module 603 of the NFC device 600 are only brought to the connection mode, so that the connection between the laptop PC 10 and the NFC device 600 may be established automatically.

The procedure for performing, after the completion of the pairing, BLTH connection between the laptop PC 10 and the NFC device 600 by using the smartphone 200 will now be described with reference to the flowchart in FIG. 11. Blocks 901, 903, 933, and 935 are identical to the blocks 701, 703, 733, and 735 in FIG. 8, and thus, the description thereof will not be repeated. It is assumed that the NFC device 600 has been switched to the sleep state and that power supply to the BLTH module 603 has been stopped. Therefore, the laptop PC 10 and the NFC device 600 are in the state where the BLTH communication link has been disconnected for reducing the power consumption. In block 931, the user executes the NFC manager 301 and selects the procedure for BLTH connection between the laptop PC 10 and the NFC device 600.

In block 937, the NFC manager 301 transmits a message for performing BLTH connection between the laptop PC 10 and the NFC device 600, to the laptop PC 10 via BLTH. In block 905, the OS 105 executes the NFC manager 101 and transmits the received message to the NFC manager 101. In block 907, the NFC manager 101 instructs the BLTH driver 107 to cause the BLTH module 77 to enter the connection mode. The BLTH module 77, which has entered the connection mode, may search for any BLTH device present in the vicinity. In the case where the BLTH device with which pairing has been completed is found, the communication link can be established automatically. At this point, however, it is not possible to find the NFC device 600 because the NFC device 600 is not in the connection mode. In block 939, the user brings the smartphone 200 close to the NFC tag 500.

In block 971, the NFC chip 501 operates as a result of the approach of the smartphone 200. The NFC manager 301 writes a command for performing the BLTH connection, into the NFC memory 503 via the NFC module 283. When the user function 601 is in the sleep state, the NFC chip 501 generates a wake-up event to wake up the user function 601, and informs the user function 601 of the command written into the NFC memory 503.

In block 973, the user function 601 that has received the command supplies power to the BLTH module 603 and causes the module to enter the connection mode. In blocks 909 and 975, the BLTH module 77 of the laptop PC 10 and the BLTH module 603 of the NFC device 600, which have both entered the connection mode, complete the connection automatically. According to the above procedure, the user may only execute the NFC manager 301 in the smartphone 200 and perform the close approach operation, to connect the BLTH modules of the laptop PC 10 and the NFC device 600. The user may not have to perform the operation for causing the NFC device 600 to enter the connection mode. In the case where an NFC device 600 is equipped with a common wireless communication function other than the BLTH function and requests a password from the laptop PC 10 or the NFC device 600 at the time of connection, it may be configured such that a password is automatically input to either of them from the smartphone 200.

The procedure for logging in to the laptop PC 10 by using the smartphone 200 will now be described with reference to the functional block diagram in FIG. 2. The OS 105, having a login password set therein, displays an authentication screen on the LCD 75 and requests an input of the login password when the laptop PC 10 boots up or wakes up from the suspended state.

In the laptop PC 10, which is not equipped with a fingerprint, face, or other biometric authentication function, the OS 105 stops the applications 103 and a service to the device driver of a peripheral device unless a user inputs a login password using the keyboard 93. It is troublesome for a user to input a password each time. With the procedure shown in FIG. 8, the BLTH driver 107 can receive the authentication information, including a user ID and login password, from the smartphone 200. The close approach operation between the smartphone 200 and an employee ID card in this case may be performed by moving one or both of them to approach each other.

The BLTH driver 107 writes the received authentication information into the volatile memory 78, and issues a system management interrupt (SMI) to cause the CPU package 51 of the laptop PC 10 to enter a system management mode (SMM). The system firmware stores the system context in an SMRAM area reserved in the system memory 71, and passes the control to an SMI handler which has been loaded into the SMRAM area. When the SMI handler reads the authentication information from the volatile memory 78, the SMI handler passes the login password to the authentication module in the OS 105, as in the case where the user input the login password using the keyboard 93. The SMI handler may erase the authentication information from the volatile memory 78 after it has read the information. As such, even if the biometric authentication device is not provided, the login authentication becomes possible without an input of a password from the keyboard 93.

While the description has been made above of the case where the laptop PC 10 uses the reader/writer function of the NFC module 283 included in the smartphone 200, the present subject matter also allows the laptop PC 10 to use the card emulation function of the NFC module 283. In this case, the card emulation function of the smartphone 200 provides the laptop PC 10 with a function equivalent to that of a contactless IC card.

When a smartphone 200 or a tablet terminal is equipped with the NFC function, it is readily possible to use the card emulation function by performing the close approach operation. While it may not be practical to bring the body of a laptop PC 10 close to a fixed reader/writer as in the case of a contactless IC card, if the procedure shown in FIG. 8 or 10 is used, the close approach operation of the smartphone 200 makes it possible for the NFC device 600 to read the information stored in the laptop PC 10. Accordingly, for example, when the laptop PC 10 stores information of a ticket bought from a Web site, the ticket information does not have to be transferred to the smartphone 200 in advance. Rather, after the laptop PC 10 is set to the state where it can communicate with the smartphone 200 via BLTH, the smartphone 200 may be brought close to the reader/writer, so that the laptop PC 10 can attain the function equivalent to the card emulation function of the smartphone 200.

Figure 11:
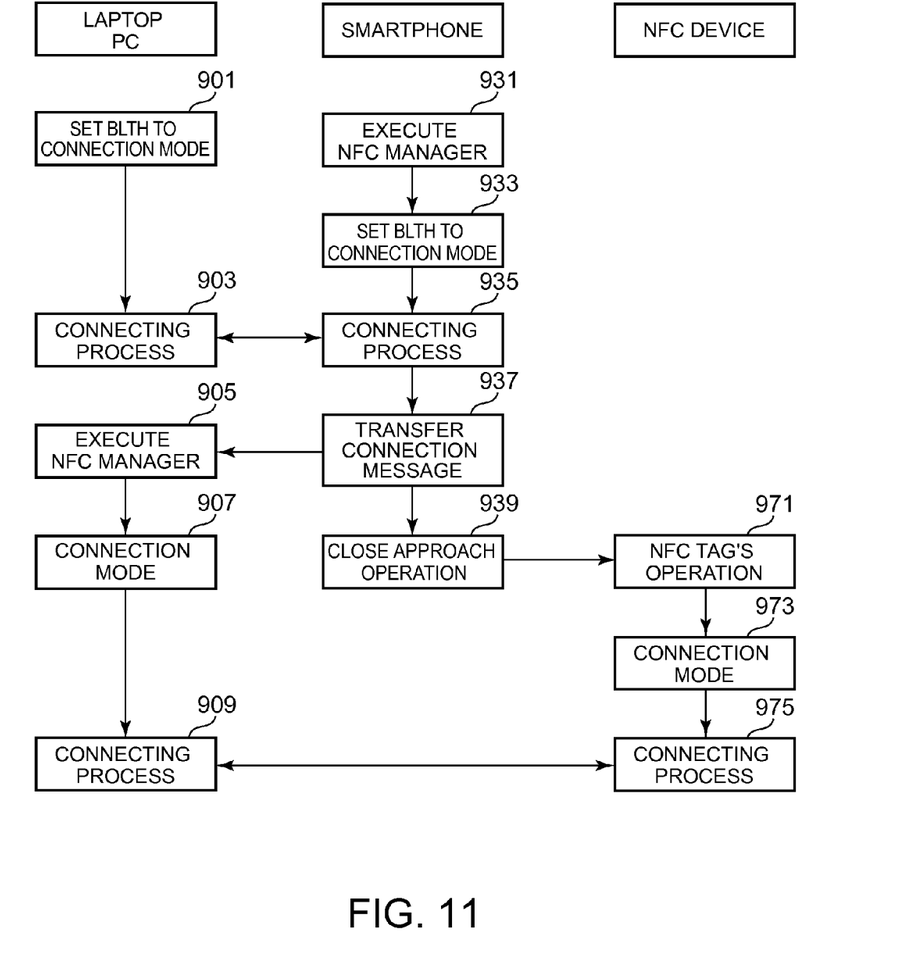
FIG. 11 is a flowchart illustrating a procedure for performing BLTH connection between the laptop PC and an NFC device by using the NFC function of the smartphone.
Figure 12:
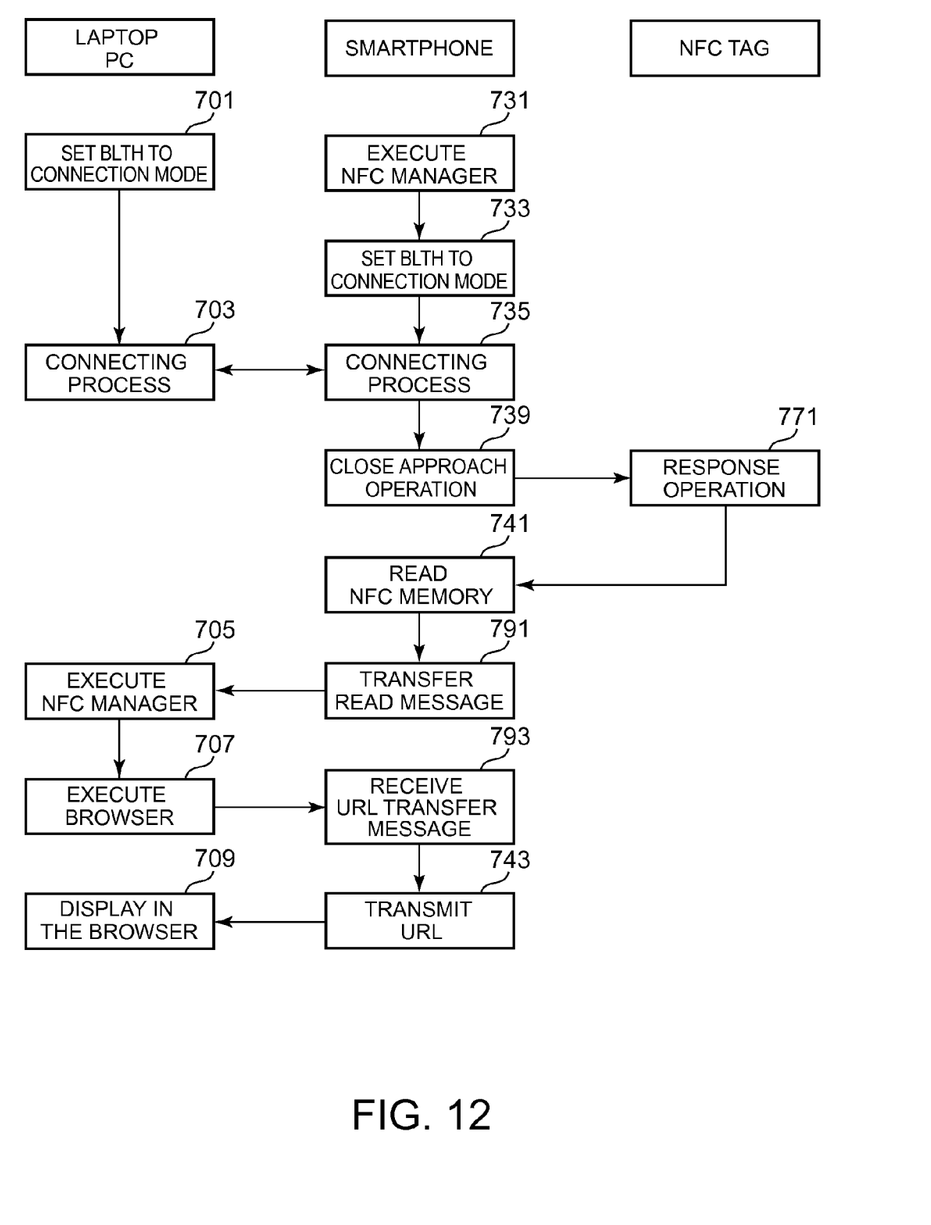
FIG. 12 is a flowchart illustrating another method for the laptop PC to access an NFC tag by using the NFC function of the smartphone.

In each of the block 737 in FIG. 8, the block 837 in FIG. 10, and the block 937 in FIG. 11, the message for reading the NFC tag 400 or 500, the message for performing BLTH pairing, or the message for performing BLTH connection was transmitted to the laptop PC 10 prior to the close approach operation of the smartphone 200. Alternatively, each message may be transmitted after data has been read from the NFC tag 400 or 500 through the close approach operation. This procedure will be described below with reference to FIG. 12 which corresponds to FIG. 8. In FIG. 12, the same blocks as those in FIG. 8 are denoted by the same reference numerals and the description thereof will not be repeated.

In block 791, from the data read from the NFC tag 400, the NFC manager 301 of the smartphone 200 determines that the processing this time is reading the NFC tag 400, and generates a message prompting the execution of a Web browser and transmits the message to the laptop PC 10. In block 793, the NFC manager 301 receives from the laptop PC 10 a message indicating that it has become ready to receive a URL, and in block 743, the NFC manager 301 transmits the URL.

This procedure is applicable to the procedures in FIGS. 10 and 11 as well. Therefore, it is unnecessary for the user to select the processing content in block 731, 831, or 931. When the close approach operation is performed after the execution of the NFC manager 301, the NFC manager 301 can determine, from the data read from the NFC tag, whether the processing content is the reading of the NFC tag 400, the BLTH pairing, or the BLTH connection, and can transmit an appropriate message as well as the data read from the NFC tag 400 or 500, to the laptop PC 10.

Embodiments may be practiced in other specific forms. The described embodiments are to be considered in all respects only as illustrative and not restrictive. The scope of the subject matter is, therefore, indicated by the appended claims rather than by the foregoing description. All changes which come within the meaning and range of equivalency of the claims are to be embraced within their scope.

What is claimed is:

1. A method comprising: transmitting a message from a first electronic equipment to a third electronic equipment to cause the third electronic equipment to enter a pairing mode prior to acquiring pairing information;

acquiring, from a second electronic equipment comprising a near field communication (NFC) tag, the pairing information through a dose approach operation using NFC, wherein the pairing information is for establishing a communication link directly between the third electronic equipment and the second electronic equipment, wherein acquiring the pairing information comprises: receiving a response from the NFC tag in response to communicating with the NFC tag; transmitting a read command to the NFC tag to read a command stored on a memory of the NFC tag in response to receiving the response, wherein, in response to transmitting the read command to the NFC tag, the NFC tag: reads the command stored on the memory of the NFC tag; in response to a user function of the second electronic equipment being in a sleep mode, wakes up the user function; and transmits the command stored on the memory of the NFC tag to the user function, wherein in response to transmitting the command to the user function, the user function: executes the command; and supplies power to a communication module of the second electronic equipment to direct the communication module to enter a pairing mode, wherein in response to the communication module entering the pairing module, the communication module:

receives a first packet from the third electronic equipment; and transmits a second packet to the third electronic equipment in response to receiving the first packet from the third electronic equipment; and receiving the pairing information from the NFC tag in response to transmitting the read command to the NFC tag; and transmitting the pairing information to the third electronic equipment to enable pairing the second electronic equipment and the third electronic equipment based on the pairing information and establishing the communication link directly between the second electronic equipment and the third electronic equipment.

2. The method according to claim 1, wherein the first electronic equipment comprises a portable electronic equipment that can be held in one hand and brought close to the NFC tag.

3. The method according to claim or 2, comprising:
executing, on the second electronic equipment, an application program in response to one or more of data or a message being received from the first electronic equipment; and
implementing a function for the application program to process the one or more of the data or the message in the second electronic equipment.

4. The method according to claim 1, wherein the third electronic equipment is a laptop personal computer.

5. The method according to claim 1, wherein the first electronic equipment is a tablet terminal or a smartphone.

6. The method according to claim 1, further comprising:
entering a standby state in a the third electronic equipment wherein the third electronic, equipment waits for a password for login to an operating system; and
transmitting authentication information from the second electronic equipment to the third electronic equipment, the authentication information being acquired from the NFC tag through a close approach operation.

7. The method according to claim 1, wherein the NFC tag is mounted on a contactless IC card for personal identification.

8. The method according to claim 1, wherein the communication link comprises Bluetooth®.

9. A computer capable of communicating with a first electronic equipment having a near field communication (NFC) module and a common wireless module through the common wireless module, the computer comprising:
   a processor;
   a system memory; and
   a storage device storing an operating system, an NFC manager, and an application program;
   wherein the NFC manager:
      receives a message that causes the computer to enter a pairing mode prior to receiving pairing information for establishing a communication link directly between the computer and a second electronic equipment having an NFC tag; and
      receives the pairing information from the first electronic equipment, wherein the first electronic equipment:
         receives a response from the NFC tag of the second electronic equipment in response to communicating with the NFC tag;
         transmits a read command to the NFC tag to read a command stored on a memory of the NFC tag in response to receiving the response, wherein, in response to transmitting the read command to the NFC tag, the NFC tag:
         reads the command stored on the memory of the NFC tag;
         in response to a user function of the second electronic equipment being in a sleep mode, wakes up the user function; and
         transmits the command stored on the memory of the NFC tag to the user function, wherein in response to transmitting the command to the user function, the user function:
            executes the command; and
            supplies power to a communication module of the second electronic equipment to direct the communication module to enter a pairing mode, wherein in response to the communication module entering the pairing module, the communication module:
               receives a first packet from the computer; and
               transmits a second packet to the computer in response to receiving the first packet from the computer; and
         receives the pairing information from the NFC tag in response to transmitting the read command to the NFC tag; and
         transmits the pairing information to the computer;
   wherein the NFC manager causes the computer to pair with the second electronic equipment based on the pairing information, and to establish the communication link directly between the computer and the second electronic equipment.

10. A first electronic equipment capable of communicating with a computer having a common wireless module, the first electronic equipment comprising:
   a processor;
   a system memory;
   a near field communication (NFC) module that communicates with an NFC tag of a second electronic equipment through a close approach operation;
   a common wireless module that communicates with the computer; and
   a storage device storing an operating system and an NFC manager;
   wherein the NFC manager:
      transmits a message to the computer that causes the computer to enter a pairing mode prior to the NFC module communicating with the NFC tag;
      receives a response from the NFC tag of the second electronic equipment in response to the NFC module communicating with the NFC tag;
      transmits a read command to the NFC tag to read a command stored on a memory of the NFC tag in response to receiving the response, wherein, in response to transmitting the read command to the NFC tag, the NFC tag:
         reads the command stored on the memory of the NFC tag;
         in response to a user function of the second electronic equipment being in a sleep mode, wakes up the user function; and
         transmits the command stored on the memory of the NFC tag to the user function, wherein in response to transmitting the command to the user function, the user function:
            executes the command; and
            supplies power to a communication module of the second electronic equipment to direct the communication module to enter a pairing mode, wherein in response to the communication module entering the pairing module, the communication module:
               receives a first packet from the computer; and
               transmits a second packet to the computer in response to receiving the first packet from the computer; and
      receives pairing information from the NFC tag in response to transmitting the read command to the NFC tag; and
      transmits the pairing information to the computer to enable the computer to pair with the second electronic equipment.

11. A program product comprising a non-transitory computer readable storage medium that stores code executable by a processor, the executable code comprising code to perform:
   receiving a message that causes the computer to enter a pairing mode prior to receiving pairing information for establishing a communication link directly between the computer and a second electronic equipment having an NFC tag; and
   receives the pairing information from a first electronic equipment, wherein the first electronic equipment:
      receives a response from the NFC tag of the second electronic equipment in response to communicating with the NFC tag;
      transmits a read command to the NFC tag to read a command stored on a memory of the NFC tag in response to receiving the response, wherein, in response to transmitting the read command to the NFC tag, the NFC tag:
         reads the command stored on the memory of the NFC tag;
         in response to a user function of the second electronic equipment being in a sleep mode, wakes up the user function; and
         transmits the command stored on the memory of the NFC tag to the user function, wherein in response to transmitting the command to the user function, the user function:
            executes the command; and supplies power to a communication module of the second electronic equipment to direct the communication module to enter a pairing mode, wherein in response to the communication module entering the pairing mode, the communication module:
  receives a first packet from the computer; and
  transmits a second packet to the computer in response to receiving the first packet from the computer; and
receives the pairing information from the NFC tag in response to transmitting the read command to the NFC tag; and
transmits the pairing information to the computer;
causing the computer to pair with the second electronic equipment; and
causing the computer to establish the communication link directly between the computer and the second electronic equipment.

* * * * *